(12) United States Patent
Weber et al.

(10) Patent No.: US 7,770,975 B2
(45) Date of Patent: Aug. 10, 2010

(54) LOCKING DEVICE

(75) Inventors: Frank Weber, Odenthal (DE); Karthikeyan Subramanian, Chennai (IN)

(73) Assignee: Johnson Controls GmbH, Burscheid (DE)

( * ) Notice: Subject to any disclaimer, the term of this patent is extended or adjusted under 35 U.S.C. 154(b) by 215 days.

(21) Appl. No.: 11/578,003

(22) PCT Filed: Mar. 4, 2005

(86) PCT No.: PCT/EP2005/002278

§ 371 (c)(1), (2), (4) Date: Sep. 4, 2008

(87) PCT Pub. No.: WO2005/097543

PCT Pub. Date: Oct. 20, 2005

(65) Prior Publication Data

US 2009/0015052 A1  Jan. 15, 2009

(30) Foreign Application Priority Data

Apr. 8, 2004 (DE) .................. 10 2004 018 042

(51) Int. Cl.
*B60N 2/02* (2006.01)
*B60R 21/00* (2006.01)

(52) U.S. Cl. .................. 297/366; 297/216.13
(58) Field of Classification Search ............ 297/216.13, 297/366, 367 R; 29/428
See application file for complete search history.

(56) References Cited

U.S. PATENT DOCUMENTS 4,133,578 A * 1/1979 Fancy ..................... 297/370
4,736,986 A * 4/1988 Kato et al. ............. 297/367 R
5,138,744 A * 8/1992 Coggon ..................... 16/325
5,678,895 A * 10/1997 Matsuura et al. ........ 297/367 R
5,681,086 A   10/1997 Baloche
5,702,156 A * 12/1997 Takagi ................... 297/367 R
5,899,533 A * 5/1999 Tatematsu et al. ....... 297/367 R
6,039,400 A   3/2000 Yoshida et al.
6,273,508 B1 * 8/2001 Lange ................... 297/378.12
6,520,583 B1  2/2003 Bonk
6,926,363 B2 * 8/2005 Yamashita ................ 297/366
2003/0227206 A1 * 12/2003 Choi ......................... 297/366

FOREIGN PATENT DOCUMENTS

DE   39 35 359 C2   5/1991
DE   196 16 680 C2  11/1997
DE   100 21 403 A1  11/2001
DE   100 48 127 A1  4/2002

(Continued)

OTHER PUBLICATIONS

International Search Report for PCT/EP2005/002278, date of mailing May 24, 2005, 3 pages.

*Primary Examiner*—Milton Nelson, Jr.
(74) *Attorney, Agent, or Firm*—Foley & Lardner LLP

(57) ABSTRACT

A locking device, such as a pawl and sector latch for a vehicle seat, is provided. The locking device includes a first fitting part having a body portion and an insert form-fitted in a recess in an outer periphery of the body portion. The insert has an outer contour having a plurality of teeth. The locking device further includes a second fitting part configured to be moved into a releasable form-fitting engagement with the first fitting part.

20 Claims, 2 Drawing Sheets

FOREIGN PATENT DOCUMENTS

| | | |
|---|---|---|
| DE | 102 16 461 C1 | 10/2003 |
| DE | 102 26 293 A1 | 1/2004 |
| DE | 10 2004 018 042 B3 | 9/2005 |
| EP | 1 074 426 A2 | 2/2001 |
| EP | 1 225 086 A1 | 7/2002 |
| EP | 1 260 405 A1 | 11/2002 |

* cited by examiner

1

LOCKING DEVICE

CROSS-REFERENCE TO RELATED PATENT APPLICATIONS

The present application is a National Phase application of PCT/EP2005/002278 entitled, "Blocking Mechanism, Especially for a Vehicle Seat" filed on Mar. 4, 2005 which published under PCT Article 21(2) on Oct. 20, 2005 as WO 2005/097543 A1 in the German language, which claims priority to German Patent Application DE 10 2004 018 042.3 filed Apr. 8, 2004, the entire disclosure of which, including the specification and drawings, is expressly incorporated herein by reference.

BACKGROUND

The present invention relates to a blocking mechanism or locking device. More specifically, the present invention relates to a locking device for a vehicle seat having a first fitting part that is configured to be brought into a releasable, form-fitting engagement with a second fitting part.

German Publication No. DE 102 26 293 A1 discloses a locking device of the generic type. The disclosed locking device comprises a first fitting part which is connected to the seat part of a vehicle seat and a second fitting part, in the form of a latching pawl, arranged pivotally on the backrest of the seat. The backrest is rotatable about a horizontal pivot axis in relation to the seat part so that during the rotation, the latching pawl is also displaced around the outer circumference of the first fitting part. Engagement between the latching pawl and toothings on the first fitting part provide for a releasable locking of the backrest with the seat part in various inclination positions.

Locking devices of this type are well-established in practice. However, depending on the fineness of the toothing and the required strength, it is frequently necessary to manufacture the entire fitting part, equipped with the toothing, from a high-strength, hardened material. These materials are comparatively expensive and require relatively complicated machining. Furthermore, care has to be taken to ensure distortion-free installation of the fitting parts manufactured from these materials, since such fitting parts, due to their low failure strain, tend to break if fitted improperly.

Accordingly, there is a need for a locking device that improves the previously known locking device with regard to material costs, manufacturing and/or installation properties.

SUMMARY

One exemplary embodiment relates to locking device. The locking device includes a first fitting part and a-second fitting part. At least one of the first fitting part and the second fitting part has a body portion and at least one insert which is embedded in the body portion and has a first or outer contour suitable for the form-fitting engagement with the other of the first fitting part and the second fitting part. Form-fitting engagement may be provided, for example, by toothings supported on the periphery of the insert. Such an embodiment, allows for the possibility of just manufacturing the insert from a material which is particularly suitable for the loads occurring at the form-fitting connection. According to another exemplary embodiment, both the first fitting part and the second fitting part may be provided with corresponding inserts, for example, if both the first fitting part and the second fitting part are of a considerable size in comparison to the size of the regions provided with toothings.

According to another exemplary embodiment, the basic body is formed of a viscoplastic material, while the insert is formed of a relatively harder material. To produce the body portion, a steel with a tensile strength between around 450 $N/mm^2$ to 650 $N/mm^2$, in particular approximately 550 $N/mm^2$, is suitable. According to an exemplary embodiment, body portion is formed of a QSTE550 steel which can be punched directly with a justifiable degree of tool wear. According to another exemplary embodiment, the insert is formed of a hardenable steel with a tensile strength between around 1000 $N/mm^2$ to 1600 $N/mm^2$, in particular approximately 1500 $N/mm^2$, such as 42CrMo4 steel. According to another exemplary embodiment, a 16MnCr5 steel with a tensile strength of 1100 $N/mm^2$ is also suitable.

According to an exemplary embodiment, the locking device is used with a vehicle seat in backrest blocks of vehicle seats, in which the first fitting part and second fitting part are arranged such that they are rotationally movable in a manner where they are lockable with respect to each other. In such an embodiment, the axis of rotation of the rotation movement usually runs through the first fitting part while the second fitting part is designed as a latching pawl which, for its part, is pivotable and can be brought into engagement with the insert of the first fitting part in at least one rotational position between the fitting parts.

According to another exemplary embodiment, the insert is embedded in the body portion of at least one of the first fitting part and the second fitting part in a form-fitting manner. The loads exerted on the insert by the other of the first fitting part and the second fitting part are transmitted via this form-fitting connection into the body portion and are conducted away from the body portion into the seat part. The contours of insert and body portion may be designed in such a manner that a shearing load acting on the insert changes the position thereof with respect to the body portion in such a manner that the transmission of force into the insert is improved. For example, if there is an overload acting on the mechanism, the number of teeth supported at the insert and corresponding component that are in engagement may be increased in an attempt to reduce the likelihood of failure.

According to another exemplary embodiment, the form-fitting connection between body portion and the insert only acts in the tangential or radial direction but not in the lateral direction. During installation, the insert may be readily pushed from the side into the complementary recess of the body portion. According to an exemplary embodiment, the insert is fitted to the body portion, for example, by a pressing of the body portion together with the insert (crimping) to prevent the insert from later inadvertently falling out of the body portion. According to another embodiment, the insert is fixed in at least one of the first fitting part and the second fitting part with a cohesive material joint. For example, the insert may be fixed using an elastically and/or plastically deformable compound.

Another embodiment relates to a vehicle seat. The vehicle seat includes a seat part and a backrest pivotally coupled to the seat part. The vehicle seat further includes a locking, the locking having a first fitting part, a plate and a second fitting part. The first fitting part is mounted relative to one of the seat part and the backrest and has a body portion and at least one insert coupled to the body portion. The insert has an outer contour. The plate is mounted relative to the other of the seat part and the backrest and is rotatable relative to the first fitting part. The second fitting part is mounted relative to the plate and is movable into a releasable engagement with the first fitting part. The outer contour of the insert allows for the engagement with the second fitting part.

Another embodiment relates to a method of manufacturing a locking device. The method includes the steps of providing a first fitting part with a body portion formed of a first material, coupling an insert formed of a second material to the body portion in a form-fitting manner, the insert having an outer contour and providing a second fitting part configured to be moved into a releasable form-fitting engagement with the outer contour of the insert coupled to the first fitting part. The first material is a viscoplastic material and the second material is a relatively harder material.

DETAILED DESCRIPTION

Figure 1:
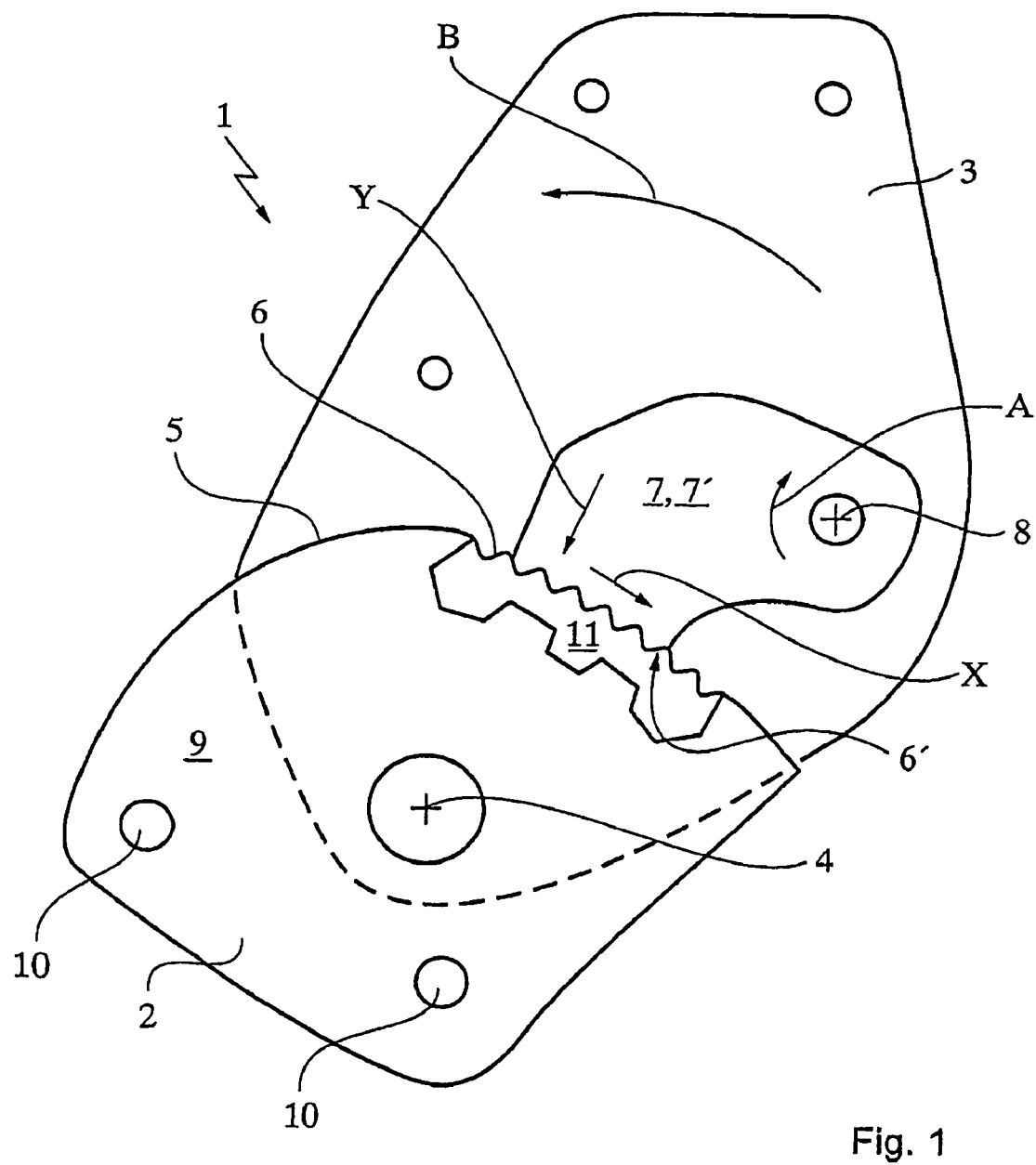
FIG. 1 is a side view of a locking device according to an exemplary embodiment.

Referring to FIG. 1, a blocking mechanism or locking device 1 is shown according to an exemplary embodiment. The locking device 1 comprises a first fitting part 2 and a fitting plate 3 which can be pivoted with respect to each other about an axis of rotation 4. A toothing 6 is incorporated into the outer contour 5 of the first fitting part 2. A second fitting part 7, which is provided with a complementary toothing 6' and is in the form of a latching pawl 7', can be brought releasably into form-fitting connection with the toothing 6. The latching pawl 7' is, for its part, arranged on the second fitting part 3 in a manner such that it can rotate about an axis 8.

According to the embodiment illustrated, the first fitting part 2 and the fitting plate 3 are secured against rotation by means of the form-fitting connection between latching pawl 7' and the toothing 6 of the first fitting part 2. Pivoting of the latching pawl 7' in the direction of the arrow A releases the form-fitting connection so that the fitting plate 3 can be rotated forward in the direction of the arrow B in relation to the first fitting part 2.

The first fitting part 2 comprises a basic body 9 which is punched from a viscoplastic steel and is connected via holes 10 in conjunction with fixing elements (e.g., screws, rivets, etc.), not illustrated, or by welding to a structural element (e.g., the seat part of a vehicle seat, etc.). The first fitting part 2 further comprises an insert 11 made of a high-strength, hardenable material which forms that region of the first or outer contour 6 of the first fitting part 2 which is provided with the toothing 6 and is embedded in the basic body 9 in a form-fitting manner. The form-fitting connection is provided such that shearing forces X acting tangentially on the insert and radial compressive forces Y are transmitted directly into the basic body 9. By contrast, a lateral pushing of the insert 11 into the basic body 9 during the installation of the blocking mechanism is possible.

Figure 2:
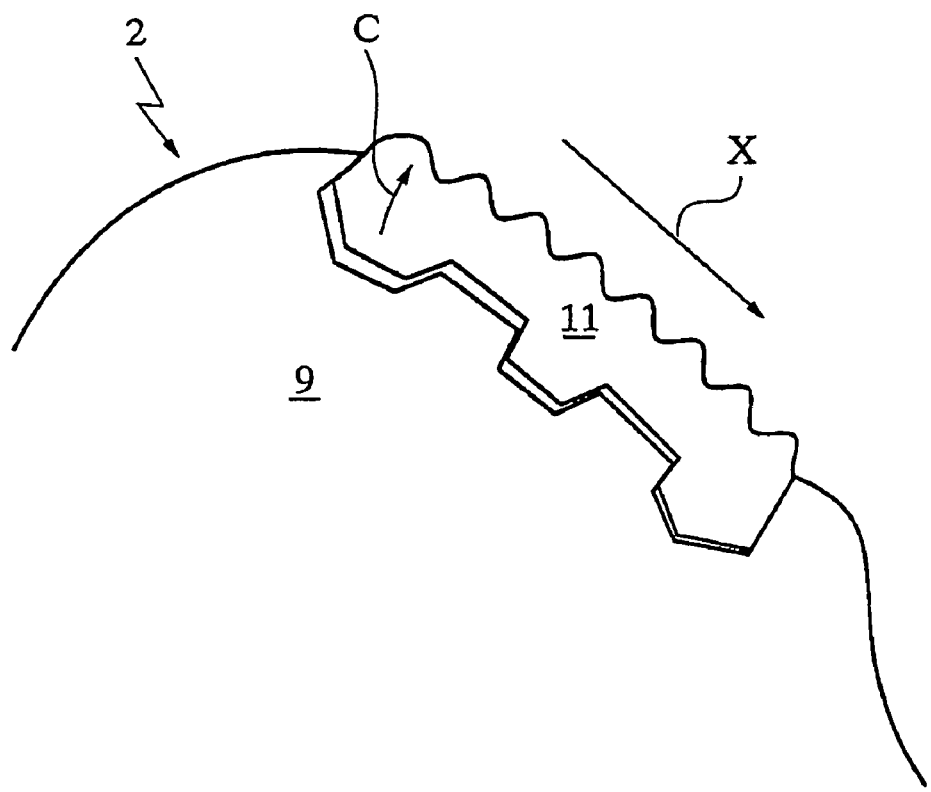
FIG. 2 is a detailed side view of the locking device of FIG. 1.

The form-fitting engagement between the insert 11 and the basic body 9 permits a certain displacement of the insert 11 in the event of an overload acting on the blocking, for example in the event of an accident. Due to elastic or even plastic deformation of the components, overloads of this type cause changes in the position of the toothings 6, 6' in relation to the design position, which may result in load peaks and, in a most unfavorable case, to the toothings 6, 6' failing. As shown in FIG. 2, the complementary contours of basic body 9 and insert 11 permit the insert 11 to tilt in the direction of the arrow C if there is a high radial force X without the form-fitting connection between basic body 9 and insert 11 being eliminated. By means of this displacement, the unavoidable tilting of the latching pawl 7' during an accident is at least partially compensated for and the loads are distributed over a greater number of teeth.

Figure 3:
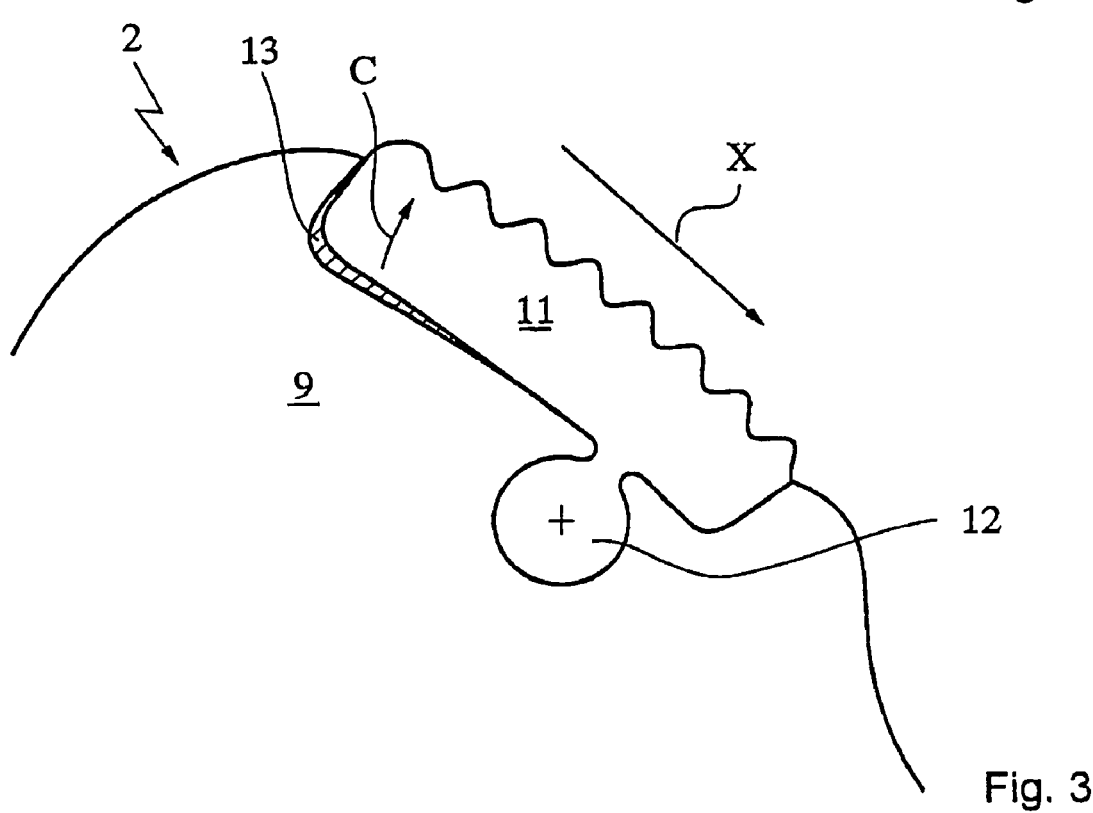
FIG. 3 is a detailed side view of a locking device according to another exemplary embodiment.

FIG. 3 shows a first fitting part 2 in which the contours of insert 11 and basic body 9 form a concrete joint 12 for this purpose. To secure the insert 11 laterally and/or to avoid rattling noises, in this exemplary embodiment the gap between insert 11 and basic body 9 is furthermore filled with an elastic compound 13.

The invention claimed is:

1. A locking device for the seat of a motor vehicle, the locking device comprising:
a first fitting part having a body portion and an insert, the body portion having an edge portion defining a recess in which the insert is received such that the insert is substantially co-planar with the body portion and substantially fixed in place during normal operation of the locking device, the insert having a first contour, the body portion being formed of a first material and the insert being formed of a second material that is harder than the first material;
a member pivotable with respect to the first fitting part; and
a second fitting part coupled to the member and configured to be moved into a releasable form-fitting engagement with the insert of the first fitting part,
wherein the first contour of the insert and a complimentary contoured surface of the second fitting part provide the form-fitting engagement.

2. The locking device of claim 1, wherein the body portion is composed of a viscoplastic material.

3. The locking device of claim 2, wherein the body portion is composed of steel having a tensile strength between approximately 450 N/mm$^2$ and approximately 650 N/mm$^2$.

4. The locking device of claim 3, wherein the steel of the body portion is QSTE550 steel having a tensile strength of approximately 550 N/mm$^2$.

5. The locking device of claim 1, the member is a plate rotatably coupled to the first fitting part, the second fitting part being movably supported at the plate.

6. The locking device of claim 5, wherein the second fitting part is a latching pawl which is pivotable relative to the plate and configured to be brought into engagement with the insert in at least one rotational position between the first and second fitting parts.

7. The locking device of claim 1, wherein the insert is embedded in the body portion in a form-fitting manner.

8. The locking device of claim 7, under a shearing load acting on the insert, the insert is configured to move relative to the body to maintain the engagement with the second fitting part while remaining embedded in the body portion.

9. The locking device of claim 7, wherein the form-fitting connection between the body portion and the insert secures the insert relative to the body portion in at least one of a tangential and a radial direction but not in a lateral direction.

10. The locking device of claim 1, wherein a cohesive material joint is provided between the insert and the body portion.

11. The locking device of claim 10, wherein the cohesive material joint is formed of a third material that is different than the first material and the second material, the third material being at least one of an elastically deformable and a plastically deformable compound that secures the insert in a lateral direction relative to the body portion.

12. The locking device of claim 3, wherein the insert is composed of a harder steel having a tensile strength between approximately 1000 N/mm² and approximately 1600 N/mm².

13. The locking device of claim 12, wherein the steel of the insert is 42CrMo4 steel having a tensile strength of approximately 1500 N/mm².

14. A vehicle seat comprising:

a seat part;

a backrest pivotally coupled with respect to the seat part; and a locking device for locking the position of the backrest with respect to the seat part, the locking device comprising:

a first fitting part mounted relative to one of the seat part and the backrest, the first fitting part having a body portion and at least one insert coupled to the body portion, the insert having a first contour, the body portion being formed of a first material and the insert being formed of a second material that is harder than the first material; and a second fitting part mounted relative to the other of the seat part and the backrest, the second fitting movable into a releasable engagement with the first fitting part, wherein the first contour of the insert is engageable with the second fitting part to fix the first and second fitting parts with respect to each other.

15. The vehicle seat of claim 14, further comprising a cohesive material joint provided between the insert and the body portion.

16. The vehicle seat of claim 15, wherein the cohesive material joint is formed of a third material that is different than the first material and the second material, the third material being at least one of an elastically deformable and a plastically deformable compound that secures the insert in a lateral direction relative to the body portion.

17. The vehicle seat of claim 14, wherein the body portion is formed of steel having a tensile strength between approximately 450 N/mm² and approximately 650 N/mm².

18. The vehicle seat of claim 17, wherein the insert is formed of a steel having a tensile strength between approximately 1000 N/mm² and approximately 1600 N/mm².

19. A method of manufacturing a locking device, the method comprising:

providing a first fitting part with a body portion formed of a first material;

coupling an insert formed of a second material to the body portion in a form-fitting manner, the insert having a first contour; and providing a second fitting part configured to be moved into a releasable form-fitting engagement with the first contour of the insert coupled to the first fitting part;

wherein the first material is a viscoplastic material and the second material is a relatively harder material.

20. The method of claim 19, further comprising the step of providing a deformable compound between the insert and the body portion that secures the insert in a lateral direction relative to the body portion.

* * * * *